(12) United States Patent
Shi et al.

(10) Patent No.: US 12,160,760 B2
(45) Date of Patent: Dec. 3, 2024

(54) HANDLING ERROR INDICATION

(71) Applicant: Telefonaktiebolaget LM Ericsson (publ), Stockholm (SE)

(72) Inventors: Nianshan Shi, Järfälla (SE); Xiaoming Li, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 440 days.

(21) Appl. No.: 17/442,221

(22) PCT Filed: Mar. 17, 2020

(86) PCT No.: PCT/SE2020/050279
§ 371 (c)(1),
(2) Date: Sep. 23, 2021

(87) PCT Pub. No.: WO2020/197467
PCT Pub. Date: Oct. 1, 2020

(65) Prior Publication Data
US 2022/0167189 A1    May 26, 2022

(30) Foreign Application Priority Data
Mar. 27, 2019  (WO) ................ PCT/CN2019/079901

(51) Int. Cl.
*H04W 24/08* (2009.01)
*H04W 8/24* (2009.01)
(52) U.S. Cl.
CPC ............. *H04W 24/08* (2013.01); *H04W 8/24* (2013.01)
(58) Field of Classification Search
CPC ................................. H04W 8/24; H04W 24/08
See application file for complete search history.

(56) References Cited

U.S. PATENT DOCUMENTS

2008/0181178 A1   7/2008  Shaheen
2012/0243400 A1   9/2012  Lefrancois et al.
(Continued)

FOREIGN PATENT DOCUMENTS

| WO | WO-2016050673 A1 * | 4/2010 | ........... H04W 24/02 |
| WO | WO-2014163550 A1 * | 10/2014 | ........... H04B 17/345 |
| WO | 2017165493 A1 | 9/2017 | |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 14)", 3GPP TS 36.413 V14.8.0, Dec. 2018, 1-359.
(Continued)

*Primary Examiner* — Kevin Kim
(74) *Attorney, Agent, or Firm* — Murphy, Bilak & Homiller, PLLC

(57) ABSTRACT

Methods performed by core network nodes and base stations for sharing error information are disclosed. A method performed by a core network node comprises initiating transmission of an ERROR INDICATION message to a base station connected to the core network node, wherein the ERROR INDICATION message comprises identification information of a wireless device that is the source of an incoming message in which an error has been detected. A method performed by a base station comprises initiating transmission of an ERROR INDICATION message to a core network node connected to the base station, wherein the ERROR INDICATION message comprises identification information of a wireless device that is the source of an incoming message in which an error has been detected. Also disclosed are core network nodes and base stations configured to perform the methods.

18 Claims, 14 Drawing Sheets

(56) References Cited

U.S. PATENT DOCUMENTS

| | | | |
|---|---|---|---|
| 2016/0150383 A1* | 5/2016 | Mildh | H04W 8/02 455/466 |
| 2016/0219630 A1 | 7/2016 | Schliwa-Bertling et al. | |
| 2021/0168799 A1* | 6/2021 | Xu | H04W 72/0446 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.4.0, Dec. 2018, 1-383.

3GPP, "3rd Generation Partnership Project; Technical Specification Group Radio Access Network; NG-RAN; NG Application Protocol (NGAP) (Release 15)", 3GPP TS 38.413 V15.2.0, Dec. 2018, 1-308.

Ericsson, "Collected corrections for XnAP version 15.0.0", 3GPP TSG-RAN WG3 Meeting #101, R3-184504, Gothenburg, Sweden, Aug. 20-24, 2018, 1-203.

Ericsson, "Error Indication Message in S1AP", 3GPP TSG-RAN WG3 Meeting #103bis, R3-191701, Xian, P.R. China, Apr. 8-12, 2019, 1.

Ericsson, "Error Indication Message in S1AP", 3GPP TSG-RAN WG3 Meeting #103bis, R3-191702, Xian, P.R. China, Apr. 8-12, 2019, 1-4.

3GPP, "3rd Generation Partnership Project; Technical Specification Group Radio Access Network; Evolved Universal Terrestrial Radio Access Network (E-UTRAN); S1 Application Protocol (S1AP) (Release 15)", Draft 3GPP TS 36.413 V15.4.0, Dec. 2018, 1-383.

"ETSI TS 136 413 V15.3.0", LTE; Evolved Universal Terrestrial Radio Access Network (E-UTRAN); S1 Application Protocol (S1AP) (3GPP TS 36.413 version 15.3.0 Release 15), Sep. 2018, pp. 1-379.

"ETSI TS 138 413 V15.3.0", 5G; NG-RAN; NG Application Protocol (NGAP) (3GPP TS 38.413 version 15.3.0 Release 15), May 2019, pp. 1-314.

* cited by examiner

| IE/Group Name | Presence | Range | IE type and reference | Semantics description | Criticality | Assigned Criticality |
|---|---|---|---|---|---|---|
| Message Type | M | | 9.2.1.1 | | YES | reject |
| S-TMSI | M | | 9.2.3.6 | | YES | reject |

Fig 1.

HANDLING ERROR INDICATION

TECHNICAL FIELD

Embodiments of the present disclosure relate to methods and apparatus in networks, and particularly core network nodes, base stations and methods in core network nodes and base stations for sharing error information.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The Error Indication procedure is initiated by a node in order to report detected errors in one incoming message, such as a message from a User Equipment (UE), provided that the errors cannot be reported by an appropriate failure message. The types of error detected may include Unknown, Unforeseen and Erroneous Protocol Data errors, such as Transfer Syntax Errors, Abstract Syntax Errors and Logical Errors.

3GPP TS38.413 v15.2.0 NG-RAN NG Application Protocol (NGAP), incorporated herein by reference and available at https://portal.3gpp.org/desktopmodules/Specifications/SpecificationDetails.aspx?specificationId=3223 as of 10 Feb. 2020, a document produced by the $3^{rd}$ Generation Partnership Project provides the relevant background on how the Error Indication procedure works.

There currently exist certain challenge(s). In current technical specifications, as detailed in 3GPP TS 38.413 v15.2.0, the Error Indication procedure only supports instances where a UE (User Equipment, also referred to herein as a wireless device) is identified by one or more UE APID(s) (that is, Application Protocol ID). Typically UEs are identified by UE APID pairs, so there is an Evolved Node B, eNB, UE APID and a Mobility Management Entity, MME, UE APID when there is a UE with an associated connection (for example, connected to the eNB, which is itself connected to a MME).

Where a UE APID is available, typically this form of UE ID is used to identify the UE. The UE APID may be used even in situations wherein other forms of UE APID are available. However, a node (such as an eNB, an example of a base station) may use another form of identifier for a UE in a message sent to a further node (such as a core network node) in some cases, particularly although not exclusively in cases where a UE APID is not available. The Error Indication procedure in current technical specifications does not support other types of UE ID. Other types of UE ID which may be used by an eNB include S-TMSI (that is, System Architecture Evolution Temporary Mobile Subscriber Identifier) in LTE (Long Term Evolution) systems, and also $5^{th}$ Generation S-TMSI (5G-S-TMSI).

An eNB may only use a UE ID (or plural UE IDs) that is/are not the UE APID to communicate with the Core Network, for example, in a RETRIEVE UE INFORMATION message sent over the S1 interface (as shown in FIG. 1 where only S-TMSI is used to identify the UE). If the S-TMSI is unknown to a core network node (such as a Mobility Management Entity, MME) then where the core network node should send an ERROR INDICATION message to the eNB, it may not be possible for the core network node (for example, MME) to indicate to the eNB which UE is the source of an incoming message in which an error has been detected; the core network node may also not be able to indicate accurately what error has been detected. The reverse situation is also true, whereby the core network node sends a UE INFORMATION TRANSFER message containing S-TMSI to the eNB, the eNB may not be able to correctly send an ERROR INDICATION message in response if the S-TMSI is unknown to the eNB.

SUMMARY

It is an object of the present disclosure to improve the sharing of error information, thereby improving the efficiency with which errors may be identified, reported and resolved.

According to some embodiments there are provided methods performed by core network nodes for sharing error information, the methods comprising: initiating transmission of an ERROR INDICATION message to a base station connected to the core network node, wherein the ERROR INDICATION message comprises identification information of a wireless device that is the source of an incoming message in which an error has been detected.

According to some embodiments there are provided methods performed by Mobile Management Entities, MME, for sharing error information, the methods comprising: initiating transmission of an ERROR INDICATION message to an Evolved Node B, eNB, connected to the MME: wherein the ERROR INDICATION message comprises identification information of a wireless device that is the source of an incoming message in which an error has been detected; wherein the identification information comprises a System Architecture Evolution Temporary Mobile Subscriber Identifier, S-TMSI, of the wireless device; and wherein the eNB and MME use S1 Application Protocol, S1AP, or Next Generation Application Protocol, NGAP.

According to some embodiments there are provided methods performed by base stations for sharing error information, the methods comprising: initiating transmission of an ERROR INDICATION message to a core network node connected to the base station, wherein the ERROR INDICATION message comprises identification information of a wireless device that is the source of an incoming message in which an error has been detected.

According to some embodiments there are provided methods performed by a Evolved Node B, eNB, for sharing error information, the method comprising: initiating transmission of an ERROR INDICATION message to a Mobile Management Entity, MME, connected to the eNB: wherein the ERROR INDICATION message comprises identification information of a wireless device that is the source of an incoming message in which an error has been detected; wherein the identification information comprises a System Architecture Evolution Temporary Mobile Subscriber Identifier, S-TMSI, of the wireless device; and wherein the eNB and MME use S1 Application Protocol, S1AP, or Next Generation Application Protocol, NGAP.

Further embodiments provide core network nodes, MMEs, base stations and eNBs configured to perform the methods.

BRIEF DESCRIPTION OF DRAWINGS

For a better understanding of the present disclosure, and to show how it may be put into effect, reference will now be made, by way of example only, to the accompanying drawings, in which:

FIG. 1 illustrates a request for UE information sent by an eNB over the S1 interface;

DETAILED DESCRIPTION

Figure 2:
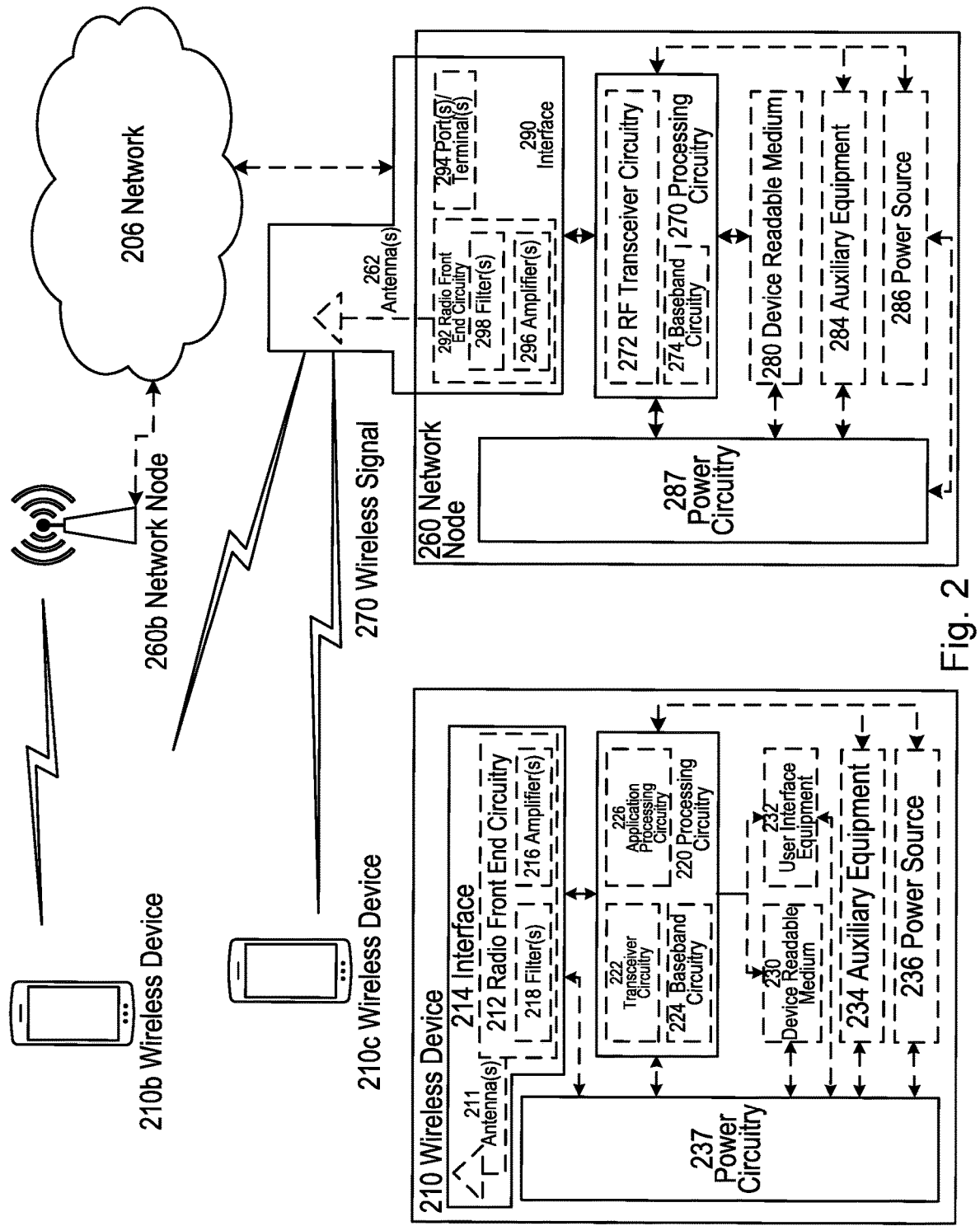
FIG. 2 is a schematic diagram of a wireless network in accordance with some embodiments.

Certain aspects of the present disclosure and their embodiments may provide solutions to these or other challenges.

The UE ID other than the UE APID, for example, S-TMSI, or 5G-S-TMSI may be included in the ERROR INDICATION. In the situation that no UE APID is allocated and only the other UE ID (such as S-TMSI) is used in a message such as a RETRIEVE UE INFORMATION message or a UE INFORMATION TRANSFER message, a node (such as a core network node) that receives the message and detects an error could issue an ERROR INDICATION message that pinpoints which UE is the source of an incoming message in which an error has been detected. The node that sent the message (that is, the RETRIEVE UE INFORMATION message), may receive the ERROR INDICATION including the UE ID other than the UE APID, and may use the contents of the ERROR INDICATION message to build the following messages accordingly. As an example of this, the node may not include the unknown UE APID when it is optionally present in a subsequent message.

In summary, the node detecting an error may be able to send useful ERROR INDICATION when the UE is not identified by UE AP ID(s).

There are, proposed herein, various embodiments which address one or more of the issues disclosed herein. An embodiment provides a method performed by a core network node for sharing error information, the method comprising: initiating transmission of an ERROR INDICATION message to a base station connected to the core network node, wherein the ERROR INDICATION message comprises identification information of a wireless device that is the source of an incoming message in which an error has been detected. The ERROR INDICATION message may include a UE identity element, which may specify whether or not one or more UE identity formats are used with numerical references for the UE identity formats or wherein the UE identity formats are listed. By providing to the base station (potentially in response to a message sent by the base station, such as a RETRIEVE UE INFORMATION message) an indication of a wireless device identifier that is unknown to the core network node, efficiency of future communication may be improve. As an example, the base station may omit the unknown UE identity information from subsequent messages, and thereby reduce the probability of further ERROR INDICATION messages being required.

An embodiment provides a method performed by a base station for sharing error information, the method comprising: initiating transmission of an ERROR INDICATION message to a core network node connected to the base station, wherein the ERROR INDICATION message comprises identification information of a wireless device that is the source of an incoming message in which an error has been detected. The ERROR INDICATION message may include a UE identity element, which may specify whether or not one or more UE identity formats are used with numerical references for the UE identity formats or wherein the UE identity formats are listed. By providing to the core network node (potentially in response to a message sent by the core network node, such as a UE INFORMATION TRANSFER message) an indication of a wireless device identifier that is unknown to the base station, efficiency of future communication may be improve. As an example, the core network node may omit the unknown UE identity information from subsequent messages, and thereby reduce the probability of further ERROR INDICATION messages being required.

Certain embodiments may provide one or more of the following technical advantage(s). A node that detects an error could indicate the correct UE when APIDs are not used, but other UE IDs (such as S-TMSI or 5G-S-TSMI) are used. This information may be important for a node that sends a RETRIEVE UE INFORMATION message or UE INFORMATION TRANSFER message, so that the node that sends the RETRIEVE UE INFORMATION message or UE INFORMATION TRANSFER message is informed of what went wrong by the node (which may be a MME, eNB, etc.) receiving the RETRIEVE UE INFORMATION or UE INFORMATION TRANSFER message.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

In aspects of embodiments, any suitable UE IDs may be included in the Error Indication procedure, so that when an error is detected by a node (for example, a base station), it could send an ERROR INDICATION message to a (further) base station or core network node using the given UE ID or IDs. The ERROR INDICATION message may therefore include, for example, a S-TMSI and/or IMSI as the UE ID or IDs. In 5G systems, a 5G-S-TMSI may be used. The ERROR INDICATION message may be sent by a node (such as a core network node) that has detected an error in response to a message from a base station, for example, a RETRIEVE UE INFORMATION message. In general, the ERROR INDICATION message may be sent between nodes.

The UE IDs, other than APIDs, which may be included in the messages addressing the specific UE include S-TMSI and 5G-S-TMSI UE IDs. Other suitable UE IDs may additionally or alternatively be included. An example implementation in an aspect of an embodiment in an LTE system is where the S-TMSI for a UE is added to the ERROR INDICATION for S1AP, for example, as an additional element in the message. An example of the ERROR INDICATION message format as shown in 3GPP TS 36.413 V14.8.0 section 9.1.8.3 (available at https://portal.3gpp.org/desktopmodules/Specifications/SpecificationDetails.aspx?specificationId=2446 as of 10 Feb. 2020) is shown in the extract below; in table 1 the message format includes the additional element for the S-TMSI UE ID as discussed above (shown in the bottom row of table 1). The S-TMSI is optional, as indicated by the "O" in the presence column.

9.1.8.3 ERROR INDICATION

This message is sent by both the MME and the eNB and is used to indicate that some error has been detected in the node.

Direction: MME→eNB and eNB→MME

TABLE 1

| S-TMSI is included in ERROR INDICATION in chapter 9.1.8.3 in S1AP | | | | | | |
|---|---|---|---|---|---|---|
| IE/Group Name | Presence | Range | IE type and reference | Semantics description | Criticality | Assigned Criticality |
| Message Type | M | | 9.2.1.1 | | YES | ignore |
| MME UE S1AP ID | O | | 9.2.3.3 | | YES | ignore |
| eNB UE S1AP ID | O | | 9.2.3.4 | | YES | ignore |
| Cause | O | | 9.2.1.3 | | YES | ignore |
| Criticality Diagnostics | O | | 9.2.1.21 | | YES | ignore |
| S-TMSI | O | | 9.2.3.6 | | YES | ignore |

In aspects of embodiments, a more general UE Identity may be introduced. In these aspects of embodiments, the presence of various UEID formats such as S-TMSI, 5G-S-TMSI, and so on can be indicated using either enumerated values, or as a list of choices. The message format of 3GPP TS 36.413 V14.8.0 section 9.1.8.3 modified to include the message format is shown in table 2 below, wherein the message format includes the additional element including an enumerated list of as discussed above (shown in the bottom row of table 2). A further aspect of an embodiment is illustrated in table 3, which shows additional elements that may be added to the ERROR INDICATION message to provide a list format.

9.1.8.3 Error Indication

This message is sent by both the MME and the eNB and is used to indicate that some error has been detected in the node.

Direction: MME→eNB and eNB→MME

TABLE 2

| UE Identity is included in ERROR INDICATION in chapter 9.1.8.3 in S1AP | | | | | | |
|---|---|---|---|---|---|---|
| IE/Group Name | Presence | Range | IE type and reference | Semantics description | Criticality | Assigned Criticality |
| Message Type | M | | 9.2.1.1 | | YES | ignore |
| MME UE S1AP ID | O | | 9.2.3.3 | | YES | ignore |
| eNB UE S1AP ID | O | | 9.2.3.4 | | YES | ignore |
| Cause | O | | 9.2.1.3 | | YES | ignore |
| Criticality Diagnostics | O | | 9.2.1.21 | | YES | ignore |
| UE Identity | O | | ENUMERATED (S-TMSI, IMSI, . . . ) | | YES | ignore | x.y.z UE Identity

TABLE 3

Indicate UE ID format using list of formats.

| IE/Group Name | Presence | Range | IE type and reference | Semantics description |
|---|---|---|---|---|
| CHOICE UE Identity | M | | 9.2.1.1 | |
| >S-TMSI | | | | |
| >>S-TMSI | M | | 9.2.3.6 | |
| >IMSI | | | | |
| >>IMSI | M | | 9.2.3.11 | |

Although the above aspects of embodiments discuss modification of the ERROR INDICATION message of S1AP, it will be appreciated that the modifications discussed are equally applicable to systems using NGAP. Also, although the aspects of embodiments above refer primarily to T-TMSI and 5G-T-TMSI, it will be appreciated that other UE ID formats, other than UE APID(s), may additionally or alternatively be added to the ERROR INDICATION. The choice of which UE ID formats to add to the ERROR INDICATION message may be dependent on the specific requirements of a system utilizing the ERROR INDICATION message.

The node sending a message (such as a UE INFORMATION TRANSFER message or RETRIEVE UE INFORMATION message) could use the feedback in the ERROR INDICATION from the node receiving said message. Taking the example of a base station (for example, eNB) that sends a RETRIEVE UE INFORMATION message to a core network node (for example, MME); when the eNB receives the ERROR INDICATION back from the MME, the eNB is then aware of which S-TMSI is unknown to the MME. The eNB may then use this feedback information to configure subsequent messages sent to the MME. As an example of the configuration of subsequent messages, the eNB may not include the S-TMSI in subsequent messages, such as INITIAL UE MESSAGE, where the presence of the S-TMSI is optional.

If the unknown S-TMSI is included in the INITIAL UE MESSAGE, the MME may perform a search for the S-TMSI and (upon failing to find the unknown S-TMSI) may reject the INITIAL UE MESSAGE. The MME may reject an INITIAL UE MESSAGE including an unknown S-TMSI because if an unknown S-TMSI is included its assigned criticality is "reject"; the MME according to the specification should then issue a new ERROR INDICATION and the S1 connection should not setup.

By omitting the (optional) unknown S-TMSI, the eNB may avoid the rejection of the INITIAL UE MESSAGE. If in this case eNB does not include S-TMSI, the MME will successfully setup the S1 connection (assuming there are no other issues), and may proceed to setup the UE context and user plane.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206 (comprising at least one core network node as discussed above, which may be a MME), network nodes 260 and 260b, and WDs 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks (comprising core network nodes), IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) or user equipment (UE) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
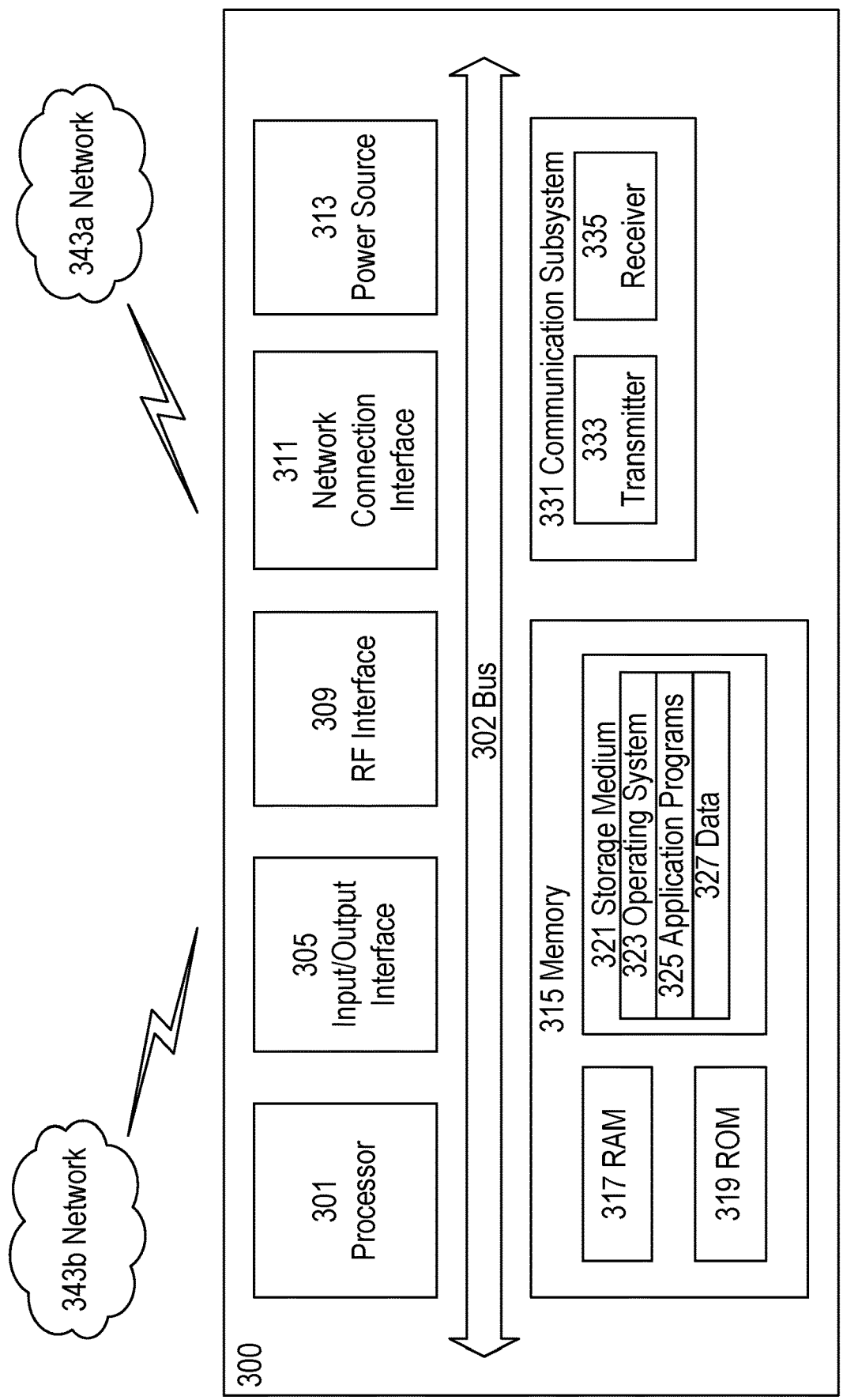
FIG. 3 is a schematic diagram of a user equipment in accordance with some embodiments.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 300 may be any UE identified by the $3^{rd}$ Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343*a*. Network 343*a* may encompass wired and/or wireless networks such as a local-area network (LAN), a wide-area network (WAN), a computer network, a wireless network, a telecommunications network, another like network or any combination thereof. For example, network 343*a* may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343*b* using communication subsystem 331. Network 343*a* and network 343*b* may be the same network or networks or different network or networks. Communication subsystem 331 may be configured to include one or more transceivers used to communicate with network 343*b*. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343*b* may encompass wired and/or wireless networks such as a local-area network (LAN), a wide-area network (WAN), a computer network, a wireless network, a telecommunications network, another like network or any combination thereof. For example, network 343*b* may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
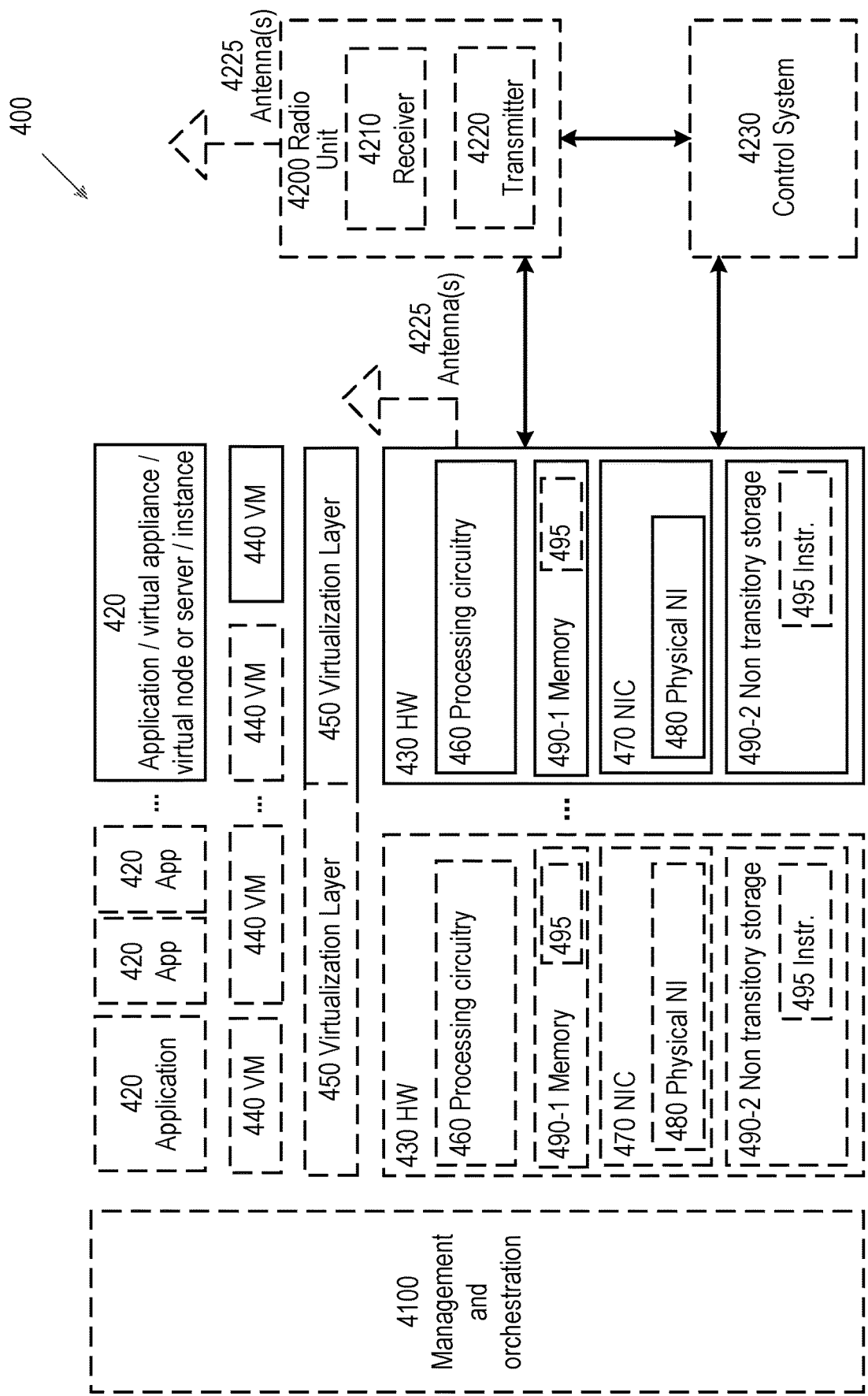
FIG. 4 is a schematic diagram of a virtualization environment in accordance with some embodiments.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be effected with the use of control system 4230 which may alternatively be used for communication between the hardware nodes 430 and radio units 4200.

Figure 5:
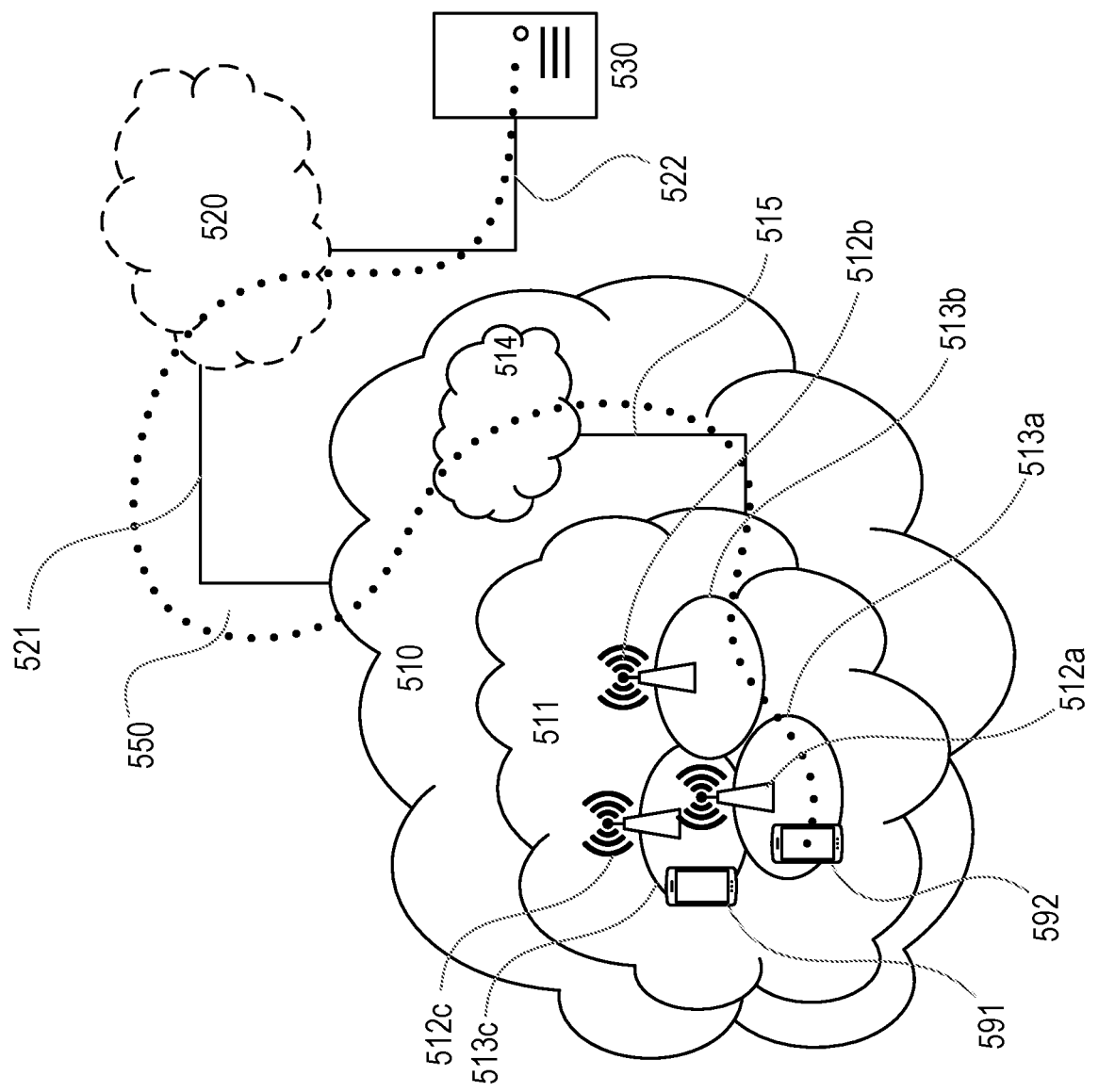
FIG. 5 is a schematic diagram of a telecommunication network connected via an intermediate network to a host computer in accordance with some embodiments.

With reference to FIG. 5, in accordance with an embodiment, a communication system includes telecommunication network 510, such as a 3GPP-type cellular network, which comprises access network 511, such as a radio access network, and core network 514 comprising one or more core network nodes as discussed above. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512*a*. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

Figure 6:
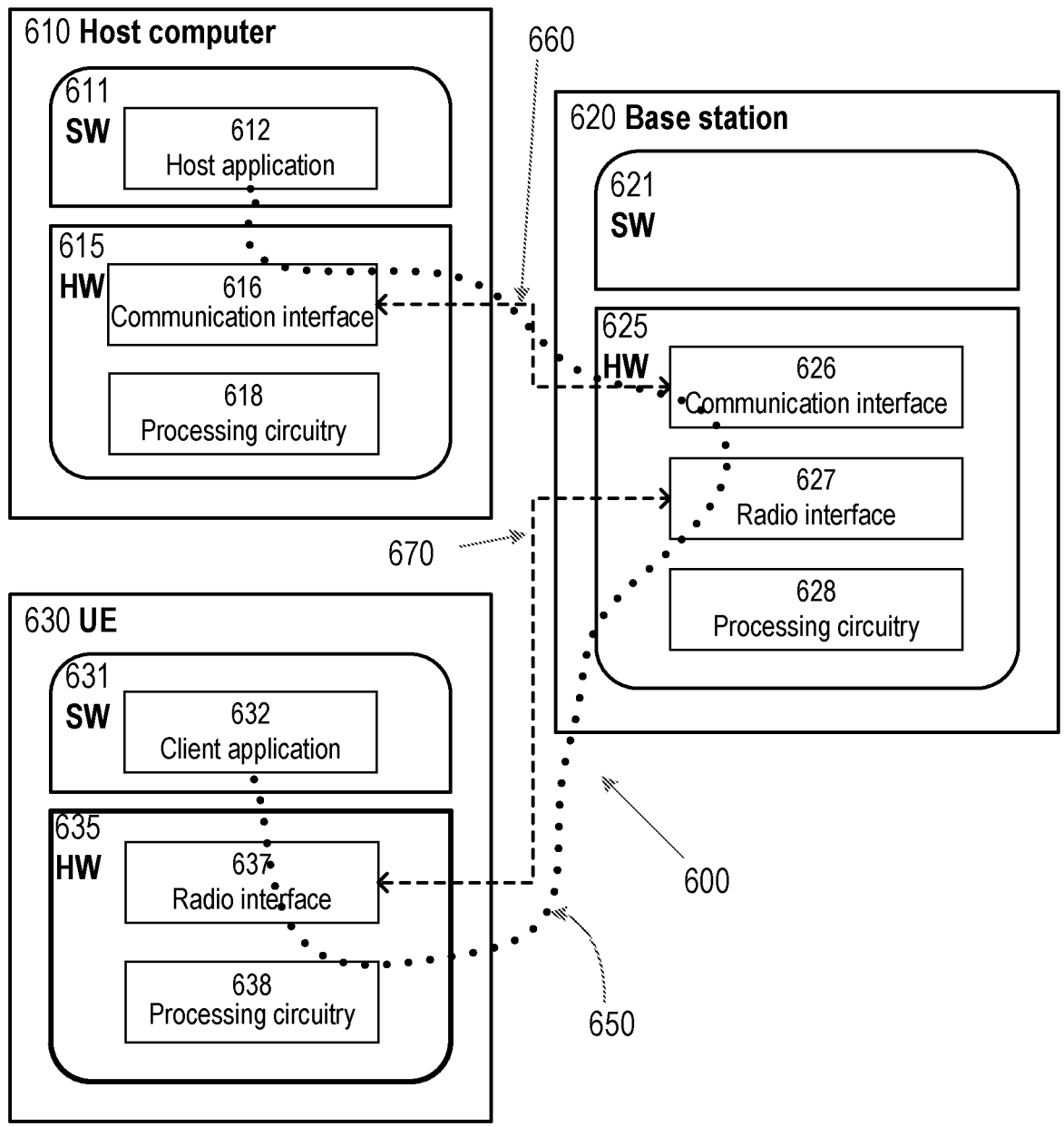
FIG. 6 is a schematic diagram of a host computer communicating via a base station with a user equipment over a partially wireless connection in accordance with some embodiments.

It is noted that host computer 610, base station 620 and UE 630 illustrated in FIG. 6 may be similar or identical to host computer 530, one of base stations 512*a*, 512*b*, 512*c* and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the handling of connection errors and the communication of error information and thereby provide benefits such as improved speed of connection and reduced chance of subsequent message rejection.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
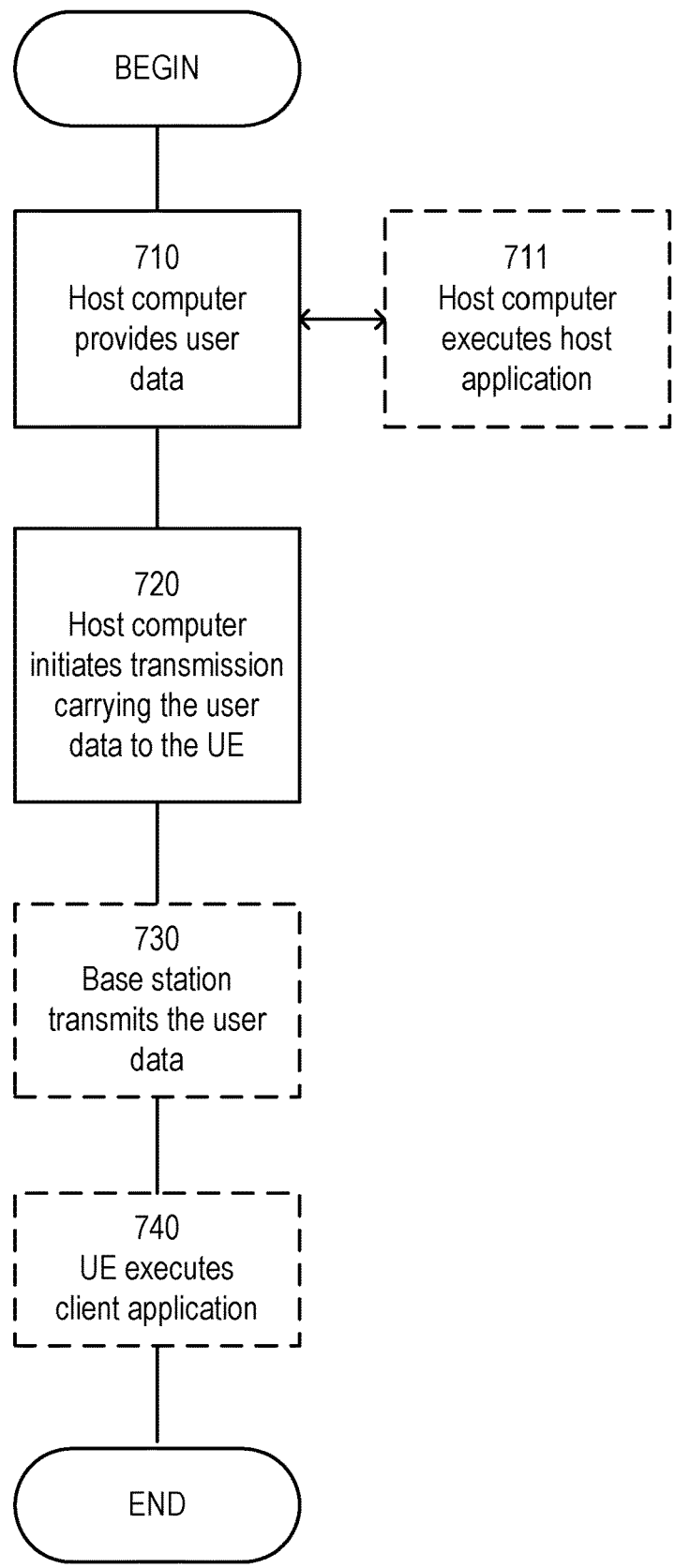
FIG. 7 is a flowchart showing methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
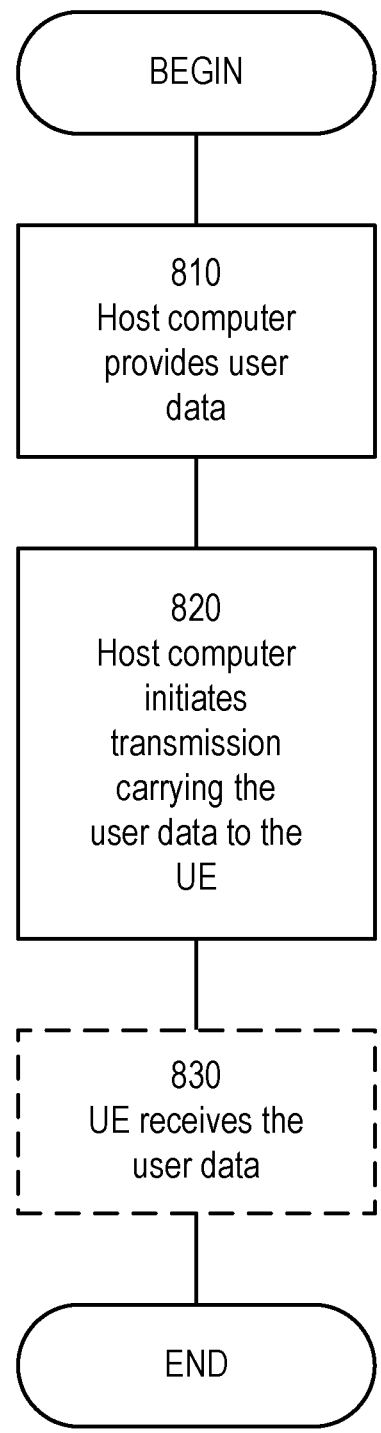
FIG. 8 is a flowchart showing methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
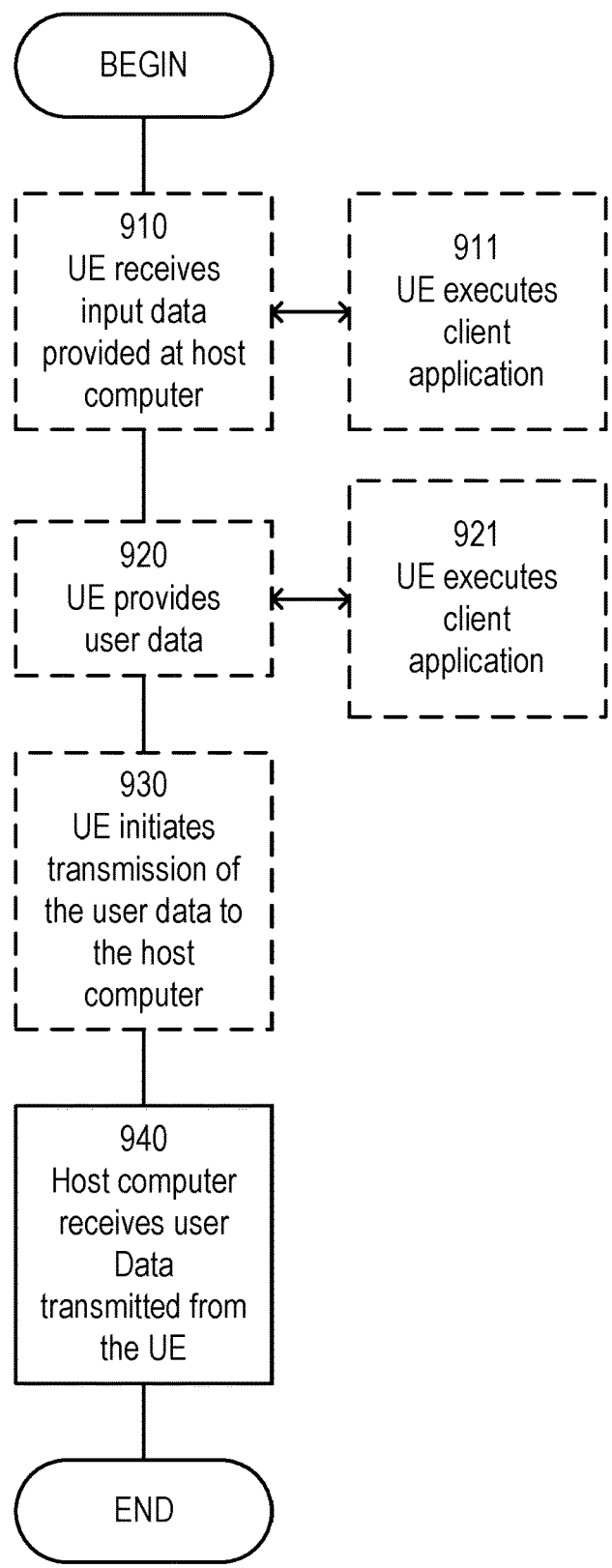
FIG. 9 is a flowchart showing methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
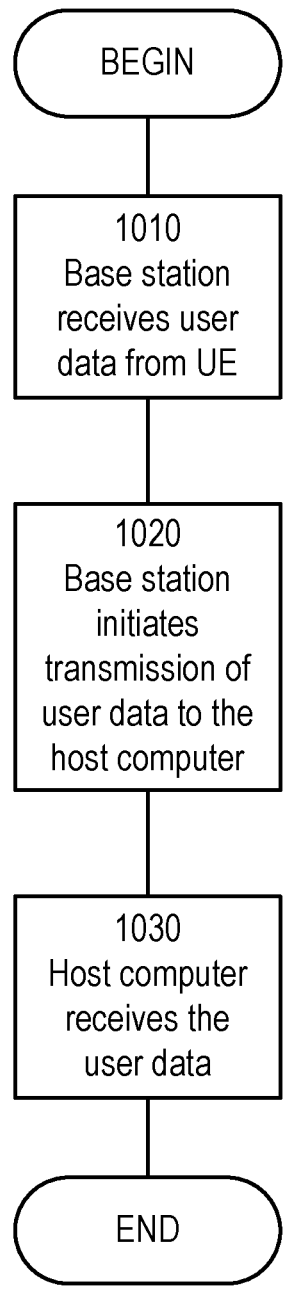
FIG. 10 is a flowchart showing methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Figure 11:
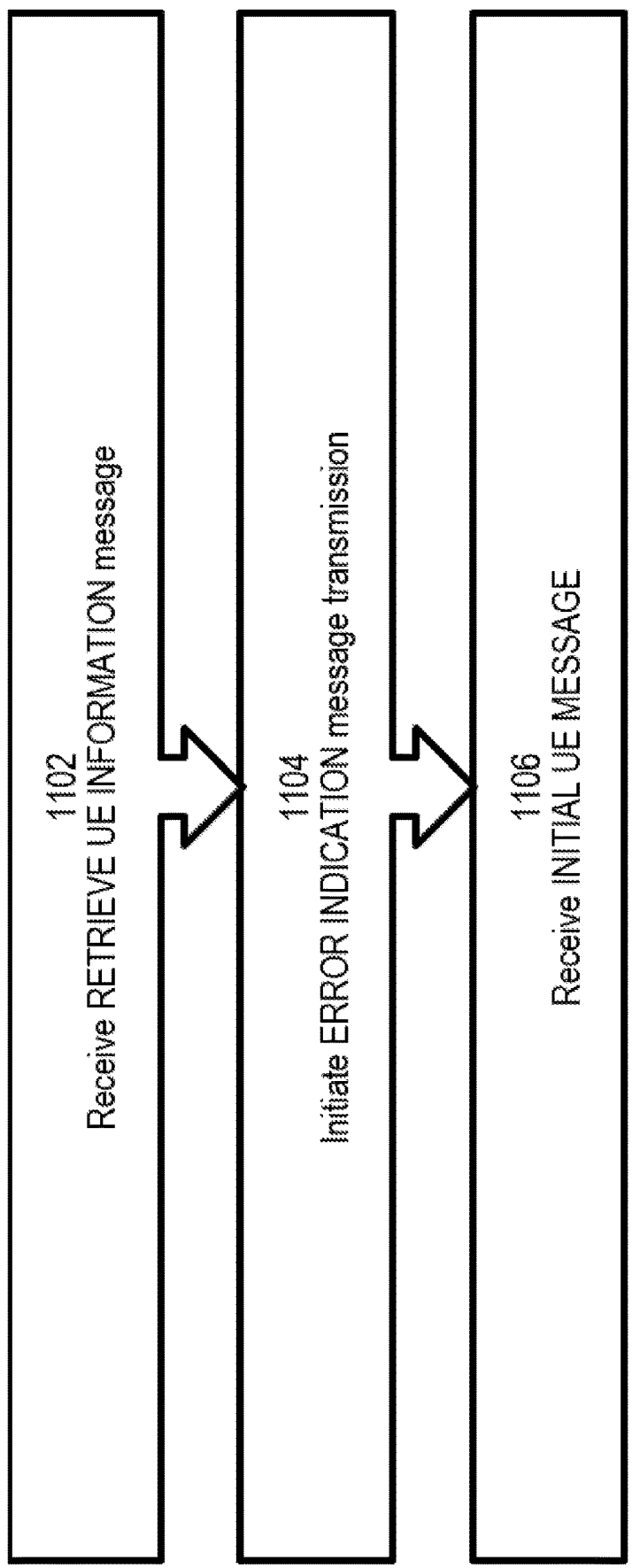
FIG. 11 is a flowchart of a method in accordance with some embodiments.

FIG. 11 depicts a method in accordance with particular embodiments. The method shown in FIG. 11 is executed by a core network node, such as a Mobile Management Entity (MME). The method begins at step 1102 with the reception of a RETRIEVE UE INFORMATION message from a base station, such as an eNB. The RETRIEVE UE INFORMATION may include identification information of a wireless device that is not an APID of the wireless device, for example, the identification information may be a temporary identifier of the wireless device such as a S-TMSI. The method may further comprise, at step 1104, initiating transmission, to the base station, of an ERROR INDICATION message. The ERROR INDICATION message may include identification information of a wireless device that is the source of an incoming message in which an error has been detected; the identification information may be the same as that included in the RETRIEVE UE INFORMATION message where step 1102 has been performed. The identification information may not be an APID, and may instead be (for example) a 5-TMSI, a 5G-S-TMSI, an IMSI, and so on. The method may further comprise, at step 1106, receiving an INITIAL UE MESSAGE from the base station. The INITIAL UE MESSAGE may omit identification information for a wireless device that has been indicated (by the ERROR INDICATION message) as being unknown to the core network node.

Figure 12:
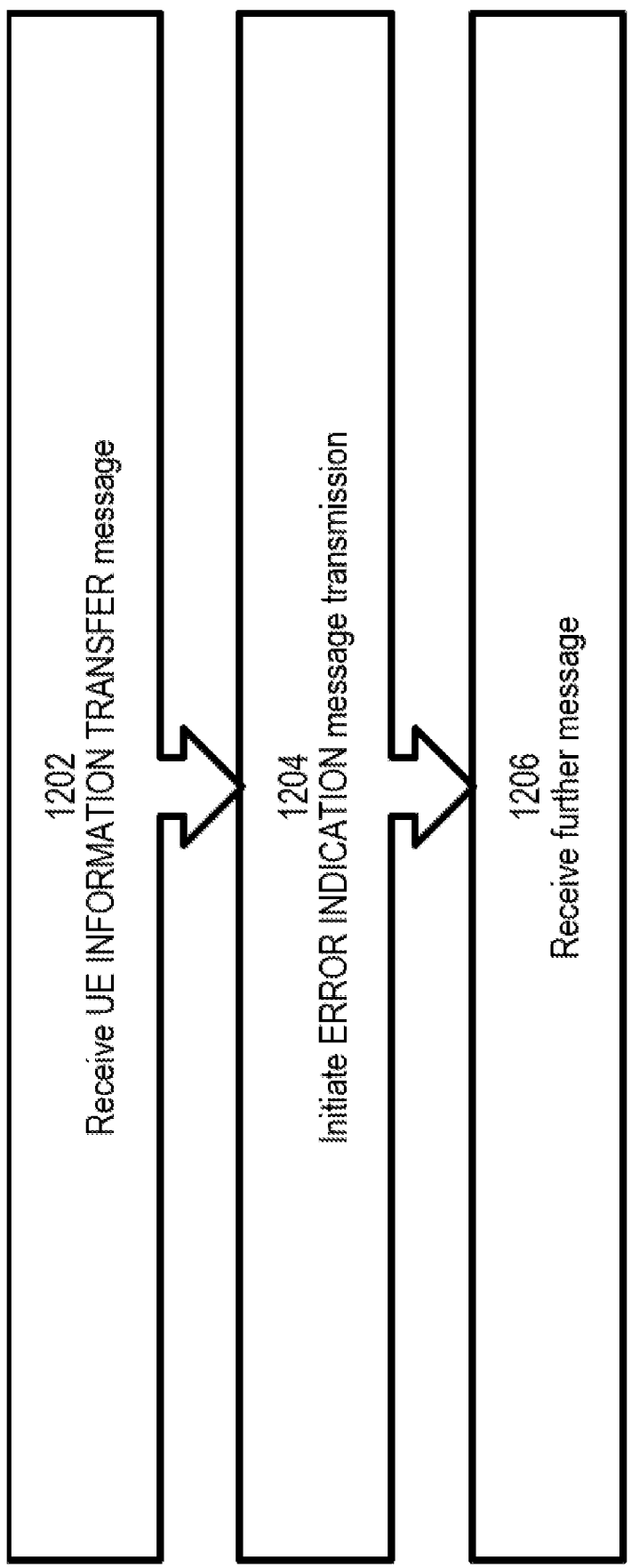
FIG. 12 is a schematic diagram of a virtualization apparatus in accordance with some embodiments.

FIG. 12 depicts a method in accordance with particular embodiments. The method shown in FIG. 12 is executed by a base station, such as an eNB. The method begins at step 1202 with the reception of a UE INFORMATION TRANSFER message from a core network node, such as an MME. The UE INFORMATION TRANSFER message may include identification information of a wireless device that is not an APID of the wireless device, for example, the identification information may be a temporary identifier of the wireless device such as a S-TMSI. The method may further comprise, at step 1204, initiating transmission, to the core network node, of an ERROR INDICATION message. The ERROR INDICATION message may include identification information of a wireless device that is the source of an incoming message in which an error has been detected; the identification information may be the same as that included in the UE INFORMATION TRANSFER message where step 1202 has been performed. The identification information may not be an APID, and may instead be (for example) a 5-TMSI, a 5G-S-TMSI, an IMSI, and so on. The method may further comprise, at step 1206, receiving a further message from the core network node. The further message may omit identification information for a wireless device that has been indicated (by the ERROR INDICATION message) as being unknown to the base station.

Figure 13:
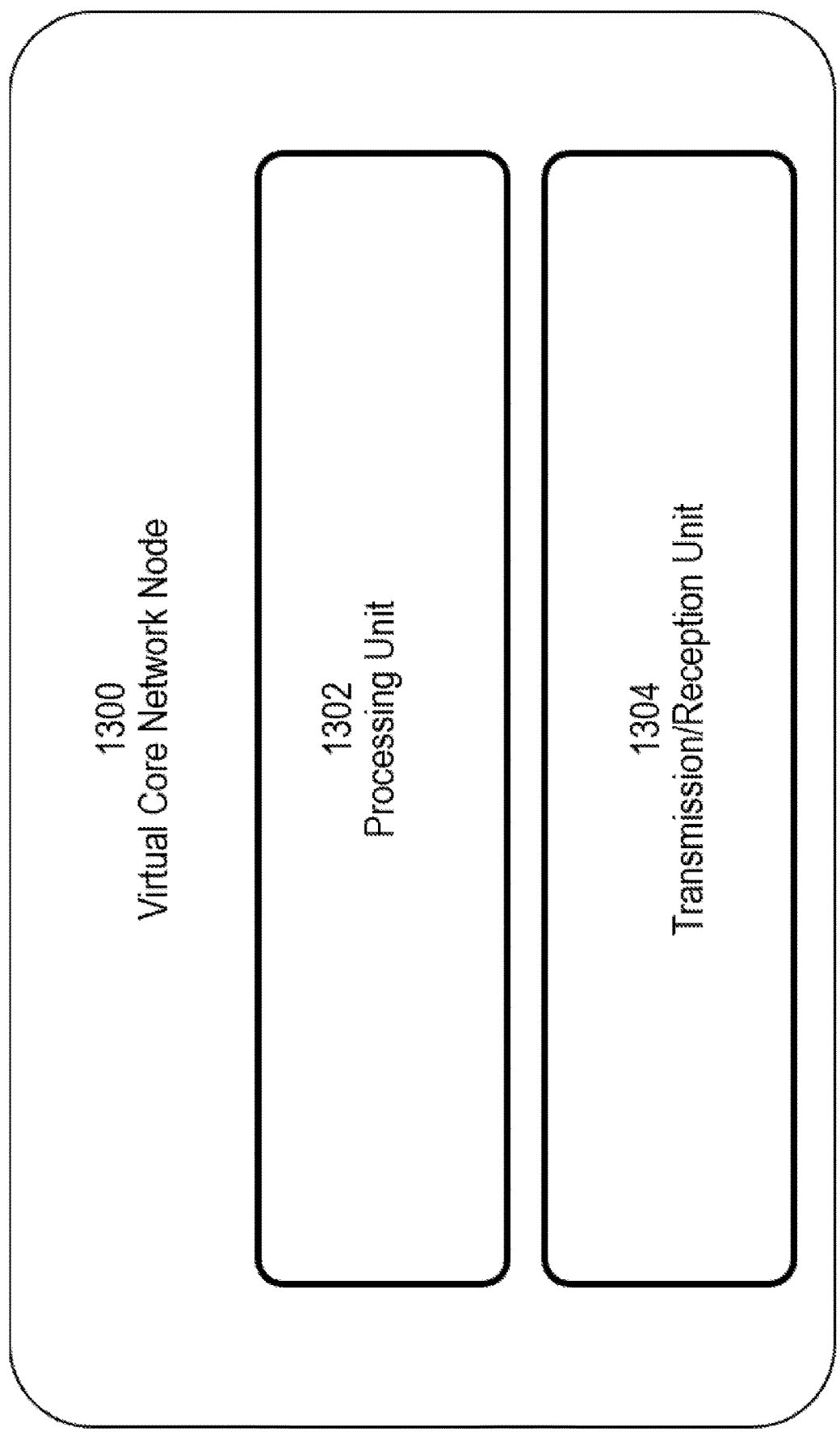
FIG. 13 is a flowchart of a further method in accordance with some embodiments.

FIG. 13 illustrates a schematic block diagram of a virtual core network node apparatus 1300 in a wireless network (for example, the wireless network shown in FIG. 2). The apparatus may be implemented in one or more core network nodes (e.g. forming part of the network 206 shown in FIG. 2). Apparatus 1300 is operable to carry out the example method described with reference to FIG. 11 and possibly any other processes or methods disclosed herein. It is also to be understood that the method of FIG. 11 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the processing unit 1302 to process information, in particular, to process the information in a message received from another node (such as a base station) via the transmission/reception unit 1304, and to cause the transmission/reception unit 1304 to transmit or initiate transmission to the another node as discussed above, and any other suitable units of apparatus 1300 to perform corresponding functions according one or more embodiments of the present disclosure.

Figure 14:
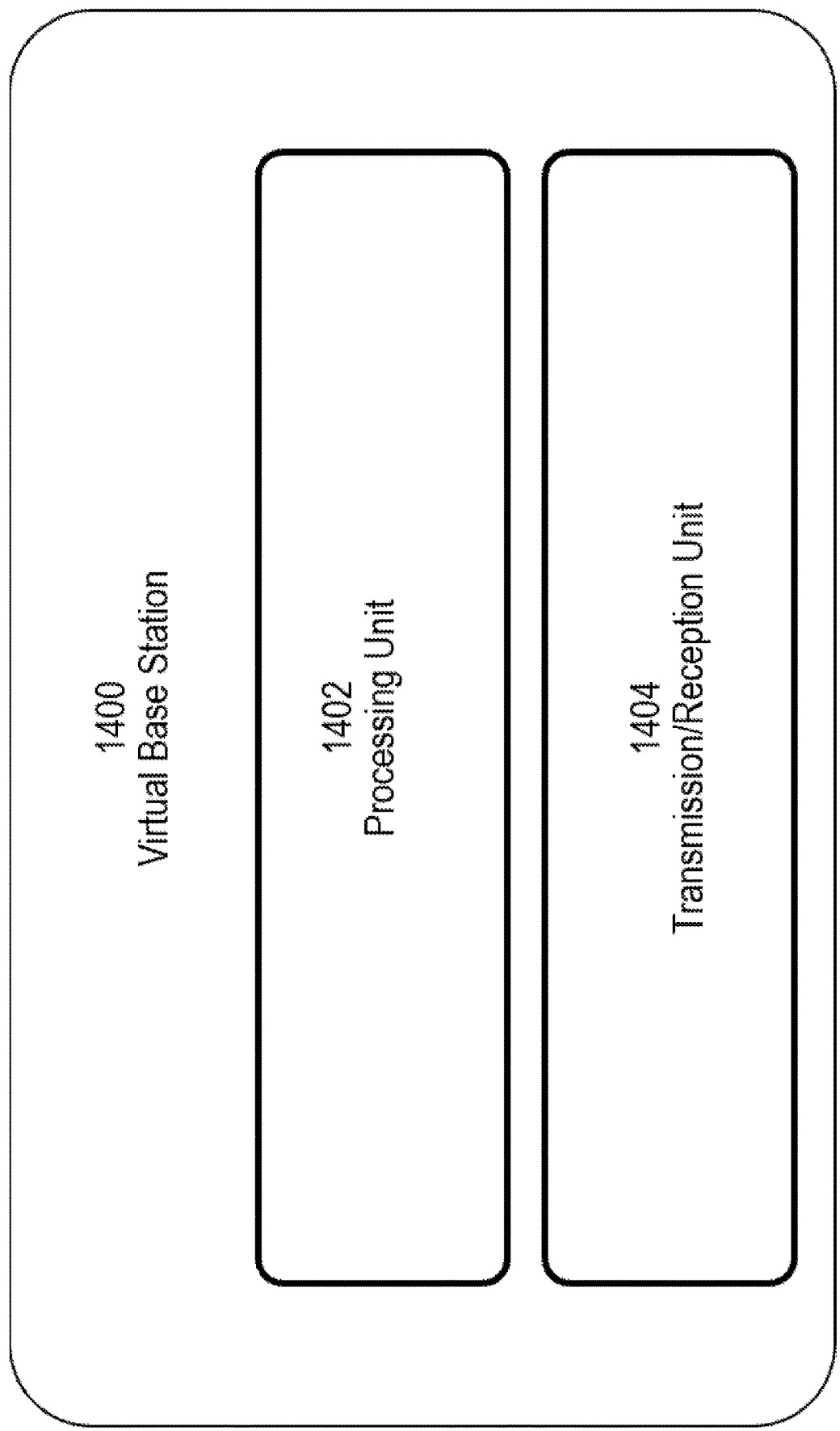
FIG. 14 is a schematic diagram of a further virtualization apparatus in accordance with some embodiments

FIG. 14 illustrates a schematic block diagram of a virtual core network node apparatus 1400 in a wireless network (for example, the wireless network shown in FIG. 2). The apparatus may be implemented in one or more base stations (e.g. network node 260 shown in FIG. 2). Apparatus 1400 is operable to carry out the example method described with reference to FIG. 12 and possibly any other processes or methods disclosed herein. It is also to be understood that the method of FIG. 12 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the processing unit 1402 to process information, in particular, to process the information in a message received from another node (such as a core network node) via the transmission/reception unit 1404, and to cause the transmission/reception unit 1404 to transmit or initiate transmission to the another node as discussed above, and any other suitable units of apparatus 1400 to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following numbered statements provide additional information on certain aspects of embodiments:

1. A method performed by a core network node for sharing error information, the method comprising:
   initiating transmission of an ERROR INDICATION message to a base station connected to the core network node,
   wherein the ERROR INDICATION message comprises identification information of a wireless device that is the source of an incoming message in which an error has been detected.
2. The method of statement 1, wherein the identification information of the wireless device comprises a temporary identifier of the wireless device.
3. The method of statement 2, wherein the temporary identifier is unique within a plurality of wireless devices served by the core network node.
4. The method of statement 3, wherein the core network node is a Mobile Management Entity, MME.
5. The method of any preceding statement, wherein the ERROR INDICATION message includes a UE identity element.
6. The method of statement 5, wherein the UE identity element specifies whether or not one or more UE identity formats are used in the ERROR INDICATION message.
7. The method of statement 6, wherein the UE identity element specifies whether or not one or more UE identity formats are used with numerical references for the UE identity formats or wherein the UE identity formats are listed.
8. The method of any preceding statement, wherein the identification information comprises at least one of:

a System Architecture Evolution Temporary Mobile Subscriber Identifier, S-TMSI;
a 5G-S-TMSI; and
an International Mobile Subscriber Identifier, IMSI.

9. The method of any preceding statement, wherein the core network node initiates transmission of the ERROR INDICATION message to the base station in response to a RETRIEVE UE INFORMATION message received from the base station.

10. The method of statement 9, wherein the RETRIEVE UE INFORMATION message contains identification information of the wireless device that is the source of the incoming message in which the error has been detected in a given UE identity format, and wherein the ERROR INDICATION message contains identification information of the wireless device that is the source of the incoming message in which the error has been detected in the same given UE identity format.

11. The method of any preceding statement, wherein the core network node and base station use S1 Application Protocol, S1AP, or NG Application Protocol, NGAP.

12. The method of any preceding statement, wherein the ERROR INDICATION message does not include an APID of the wireless device 13. A method performed by a base station for sharing error information, the method comprising:
    initiating transmission of an ERROR INDICATION message to a core network node connected to the base station,
    wherein the ERROR INDICATION message comprises identification information of a wireless device that is the source of an incoming message in which an error has been detected.

14. The method of statement 13, wherein the identification information of the wireless device comprises a temporary identifier of the wireless device.

15. The method of statement 14, wherein the temporary identifier is unique within a plurality of wireless devices served by the core network node, and wherein the core network node is a Mobile Management Entity, MME.

16. The method of any of statements 13 to 15, wherein the base station is an eNB.

17. The method of any of statements 13 to 16, wherein the ERROR INDICATION message includes a UE identity element.

18. The method of statement 17, wherein the UE identity element specifies whether or not one or more UE identity formats are used in the ERROR INDICATION message.

19. The method of statement 18, wherein the UE identity element specifies whether or not one or more UE identity formats are used with numerical references for the UE identity formats or wherein the UE identity formats are listed.

20. The method of any of statements 13 to 19, wherein the identification information comprises at least one of:
    a System Architecture Evolution Temporary Mobile Subscriber Identifier, S-TMSI;
    a 5G-S-TMSI; and
    an International Mobile Subscriber Identifier, IMSI.

21. The method of any of statements 13 to 20, wherein the base station initiates transmission of the ERROR INDICATION message to the core network node in response to a UE INFORMATION TRANSFER message received from the core network node.

22. The method of statement 21, wherein the RETRIEVE UE INFORMATION message contains identification information of the wireless device that is the source of the incoming message in which the error has been detected in a given UE identity format, and wherein the ERROR INDICATION message contains identification information of the wireless device that is the source of the incoming message in which the error has been detected in the same given UE identity format.

23. The method of any of statements 13 to 22, wherein the core network node and base station use S1 Application Protocol, S1AP, or NG Application Protocol, NGAP.

24. The method of any of statements 13 to 23, wherein the ERROR INDICATION message does not comprises an APID of the wireless device.

25. The method of any of statements 13 to 24, further comprising, by the base station, configuring subsequent messages sent to the core network node based on the information in the ERROR INDICATION message.

26. The method of statement 25 wherein, if the ERROR INDICATION message indicates that the core network node is not aware of a given UE ID in a given UE identity format, the base station may configure subsequent messages to omit the given UE ID 27. A core network node for sharing error information, the core network node comprising:
    processing circuitry configured to perform any of the steps of any of statements 1 to 12; and
    power supply circuitry configured to supply power to the core network node.

28. A base station for sharing error information, the base station comprising:
    processing circuitry configured to perform any of the steps of any of statements 13 to 26;
    power supply circuitry configured to supply power to the base station.

29. A core network node for sharing error information, the core network node comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of statements 1 to 12;
    an input interface connected to the processing circuitry and configured to allow input of information into the core network node to be processed by the processing circuitry;
    an output interface connected to the processing circuitry and configured to output information from the core network node that has been processed by the processing circuitry; and
    a power source connected to the processing circuitry and configured to supply power to the core network node.

30. A communication system including a host computer comprising:
    processing circuitry configured to provide user data; and
    a communication interface configured to forward the user data to a cellular network for transmission to a wireless device,
    wherein the cellular network comprises a base station having a radio interface and processing circuitry, the base station's processing circuitry configured to perform any of the steps of any of statements 13 to 26.
31. The communication system of statement 30 further including the base station.
32. The communication system of any of statements 30 and 31, further including the wireless device, wherein the wireless device is configured to communicate with the base station.
33. The communication system of any of statements 30 to 32, wherein:
   the processing circuitry of the host computer is configured to execute a host application, thereby providing the user data; and
   the wireless device comprises processing circuitry configured to execute a client application associated with the host application.
34. A method implemented in a communication system including a host computer, a base station and a wireless device, the method comprising:
   at the host computer, providing user data; and
   at the host computer, initiating a transmission carrying the user data to the wireless device via a cellular network comprising the base station, wherein the base station performs any of the steps of any of statements 13 to 26.
35. The method of statement 34, further comprising, at the base station, transmitting the user data.
36. The method of any of statements 34 and 35, wherein the user data is provided at the host computer by executing a host application, the method further comprising, at the wireless device, executing a client application associated with the host application.
37. A communication system including a host computer comprising:
   processing circuitry configured to provide user data; and
   a communication interface configured to forward user data to a cellular network for transmission using a core network node,
   wherein the core network node comprises a radio interface and processing circuitry, the core network node's components configured to perform any of the steps of any of statements 1 to 12.
38. The communication system of statement 37, wherein the cellular network further includes a base station configured to communicate with the core network node.
39. The communication system of any of statements 37 and 38, wherein:
   the processing circuitry of the host computer is configured to execute a host application, thereby providing the user data; and
   the communication system further comprises a wireless device, the wireless device's processing circuitry being configured to execute a client application associated with the host application.
40. A method implemented in a communication system including a host computer, a base station and a wireless device, the method comprising:
   at the host computer, providing user data; and
   at the host computer, initiating a transmission carrying the user data to the wireless device via a cellular network comprising the base station, wherein the base station performs any of the steps of any of statements 13 to 26.
41. The method of the previous statement, further comprising at the UE, receiving the user data from the base station.
42. A communication system including a host computer comprising:
   communication interface configured to receive user data originating from a transmission from a wireless device to a base station, wherein the base station comprises a radio interface and processing circuitry, the base station's processing circuitry configured to perform any of the steps of any of statements 13 to 26.
43. The communication system of statement 42, further including the UE, wherein the UE comprises a radio interface and processing circuitry.
44. The communication system of any of statements 42 and 43, further including the base station, wherein the base station comprises a radio interface configured to communicate with the wireless device and a communication interface configured to forward to the host computer the user data carried by a transmission from the wireless device to the base station.
45. The communication system of any of statements 42 to 44, wherein:
   the processing circuitry of the host computer is configured to execute a host application; and
   the wireless device's processing circuitry is configured to execute a client application associated with the host application, thereby providing the user data.
46. The communication system of any of statements 42 to 45, wherein:
   the processing circuitry of the host computer is configured to execute a host application, thereby providing request data; and
   the wireless device's processing circuitry is configured to execute a client application associated with the host application, thereby providing the user data in response to the request data.
47. A method implemented in a communication system including a host computer, a base station, a core network node and a wireless device, the method comprising:
   at the core network node, receiving data transmitted to core network node from the base station, wherein the core network node performs any of the steps of any of statements 1 to 13.
48. The method of statement 47, further comprising a wireless device, wherein the wireless device provides user data to the base station.
49. The method of any of statements 47 and 48, further comprising:
   at the wireless device, executing a client application, thereby providing the user data to be transmitted; and
   at the host computer, executing a host application associated with the client application.
50. The method of any of statements 47 to 49, further comprising:
   at the wireless device, executing a client application; and
   at the wireless device, receiving input data to the client application, the input data being provided at the host computer by executing a host application associated with the client application,
   wherein the user data to be transmitted is provided by the client application in response to the input data.
51. A communication system including a host computer comprising a communication interface configured to receive user data originating from a transmission from a core network node to a base station, wherein the base station comprises a radio interface and processing circuitry, the base station's processing circuitry configured to perform any of the steps of any of statements 13 to 26.

52. The communication system of statement 51 further including the base station.
53. The communication system of any of statements 51 and 52, further including the core network node, wherein the core network node is configured to communicate with the base station.
54. The communication system of any of statements 51 to 53, wherein:
    the processing circuitry of the host computer is configured to execute a host application;
    the communication system further comprises a UE that is configured to execute a client application associated with the host application, thereby providing the user data to be received by the host computer.
55. A method implemented in a communication system including a core network node, a base station and a wireless device, the method comprising:
    at the core network node, receiving, from the base station, user data originating from a transmission which the base station has received from the wireless device, wherein the base station performs any of the steps of any of statements 13 to 26.
56. The method of statement 55, further comprising at the base station, receiving the user data from the wireless.
57. The method of any of statements 55 and 56, further comprising at the base station, initiating a transmission of the received user data to the core network node
58. The method of any of statements 55 to 57, wherein the core network node performs any of the steps of any of statements 1 to 12.

Abbreviations

At least some of the following abbreviations may be used in this disclosure. If there is an inconsistency between abbreviations, preference should be given to how it is used above. If listed multiple times below, the first listing should be preferred over any subsequent listing(s).

NG-RAN NG Radio Access Network
NR New Radio, 5G
AMF Access and Mobility Management Function
MME Mobility Management Entity
eNB Evolved Node B
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MSC Mobile Switching Center
NPDCCH Narrowband Physical Downlink Control Channel
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a core network node for sharing error information, the method comprising:
   initiating transmission of an ERROR INDICATION message to a base station connected to the core network node,
   wherein the ERROR INDICATION message comprises identification information of a wireless device that is the source of an incoming message in which an error has been detected, and wherein the identification information of the wireless device comprises a temporary identifier of the wireless device.

2. The method of claim 1, wherein the temporary identifier is unique within a plurality of wireless devices served by the core network node.

3. The method of claim 2, wherein the core network node is a Mobile Management Entity (MME).

4. The method of claim 1, wherein the ERROR INDICATION message includes a UE identity element.

5. The method of claim 4, wherein the UE identity element specifies whether or not one or more UE identity formats are used in the ERROR INDICATION message.

6. The method of claim 5, wherein the UE identity element specifies whether or not one or more UE identity formats are used with numerical references for the UE identity formats or wherein the UE identity formats are listed.

7. The method of claim 1, wherein the core network node initiates transmission of the ERROR INDICATION message to the base station in response to a RETRIEVE UE INFORMATION message received from the base station.

8. A method performed by a base station for sharing error information, the method comprising:
   initiating transmission of an ERROR INDICATION message to a core network node connected to the base station,
   wherein the ERROR INDICATION message comprises identification information of a wireless device that is the source of an incoming message in which an error has been detected, and wherein the identification information of the wireless device comprises a temporary identifier of the wireless device.

9. The method of claim 8, wherein the temporary identifier is unique within a plurality of wireless devices served by the core network node, and wherein the core network node is a Mobile Management Entity (MME).

10. The method of claim 8, wherein the base station is an Evolved Node B(eNB).

11. The method of claim 8, wherein the ERROR INDICATION message includes a UE identity element.

12. The method of claim 11, wherein the UE identity element specifies whether or not one or more UE identity formats are used in the ERROR INDICATION message.

13. The method of claim 12, wherein the UE identity element specifies whether or not one or more UE identity formats are used with numerical references for the UE identity formats or wherein the UE identity formats are listed.

14. The method of claim 8, further comprising, by the base station, configuring subsequent messages sent to the core network node based on the information in the ERROR INDICATION message.

15. The method of claim 13 wherein, if the ERROR INDICATION message indicates that the core network node is not aware of a given UE ID in a given UE identity format, the base station may configure subsequent messages to omit the given UE ID.

16. The method of claim 8, wherein the base station initiates transmission of the ERROR INDICATION message to the core network node in response to a UE INFORMATION TRANSFER message received from the core network node.

17. A core network node for sharing error information, the core network node comprising:
   processing circuitry configured to initiate transmission of an ERROR INDICATION message to a base station connected to the core network node, wherein the ERROR INDICATION message comprises identification information of a wireless device that is the source of an incoming message in which an error has been detected, and wherein the identification information of the wireless device comprises a temporary identifier of the wireless device; and power supply circuitry configured to supply power to the core network node.

18. A base station for sharing error information, the base station comprising:

processing circuitry configured to perform the step of initiating transmission of an ERROR INDICATION message to a core network node connected to the base station, wherein the ERROR INDICATION message comprises identification information of a wireless device that is the source of an incoming message in which an error has been detected, and wherein the identification information of the wireless device comprises a temporary identifier of the wireless device; and power supply circuitry configured to supply power to the base station.

* * * * *

UNITED STATES PATENT AND TRADEMARK OFFICE
CERTIFICATE OF CORRECTION

| | | |
|---|---|---|
| PATENT NO. | : 12,160,760 B2 | Page 1 of 2 |
| APPLICATION NO. | : 17/442221 | |
| DATED | : December 3, 2024 | |
| INVENTOR(S) | : Shi et al. | |

It is certified that error appears in the above-identified patent and that said Letters Patent is hereby corrected as shown below:

In the Specification

In Column 4, Line 28, delete "improve." and insert -- improved. --, therefor.

In Column 4, Line 47, delete "improve." and insert -- improved. --, therefor.

In Column 10, Line 28, delete "units" and insert -- units. --, therefor.

In Column 11, Lines 40-41, delete "radio front end circuitry 290" and insert -- radio front end circuitry 292 --, therefor.

In Column 12, Line 56, delete "(CPE). a" and insert -- (CPE), a --, therefor.

In Column 13, Lines 42-43, delete "Radio front end circuitry 214" and insert -- Radio front end circuitry 212 --, therefor.

In Column 16, Line 27, delete "interchangeable." and insert -- interchangeably. --, therefor.

In Column 16, Lines 35-36, delete "power source 333," and insert -- power source 313, --, therefor.

In Column 19, Line 38, delete "490. Memory 490" and insert -- 490-1. Memory 490-1 --, therefor.

In Column 24, Line 59, delete "5-TMSI," and insert -- S-TMSI, --, therefor.

In Column 25, Line 18, delete "5-TMSI," and insert -- S-TMSI, --, therefor.

In Column 25, Line 57, delete "according" and insert -- according to --, therefor.

In Column 26, Line 25, delete "according" and insert -- according to --, therefor.

Signed and Sealed this
Seventeenth Day of June, 2025

Coke Morgan Stewart
*Acting Director of the United States Patent and Trademark Office*

In Column 28, Line 25, delete "ID" and insert -- ID. --, therefor.

In Column 31, Line 62, delete "Identifier" and insert -- Identity --, therefor.

In Column 32, Line 53, delete "Profile" and insert -- Power --, therefor.

In Column 32, Line 55, delete "Packet" and insert -- Packet Data Network --, therefor.

In Column 32, Line 58, delete "Precoder" and insert -- Precoding --, therefor.

In Column 33, Line 1, delete "Management" and insert -- Monitoring --, therefor.

In Column 33, Line 41, delete "Wide" and insert -- Wideband --, therefor.